US011950328B2

(12) United States Patent
Kirchoff et al.

(10) Patent No.: US 11,950,328 B2
(45) Date of Patent: Apr. 2, 2024

(54) SYSTEM AND METHOD FOR A CLOSED-LOOP BAKE-OUT CONTROL

(71) Applicant: Watlow Electric Manufacturing Company, St. Louis, MO (US)

(72) Inventors: Lincoln Kirchoff, Winona, MN (US); Lukas Thenmaier, Zell am See (AT)

(73) Assignee: WATLOW ELECTRIC MANUFACTURING COMPANY, St. Louis, MO (US)

(*) Notice: Subject to any disclaimer, the term of this patent is extended or adjusted under 35 U.S.C. 154(b) by 1193 days.

(21) Appl. No.: 16/568,757

(22) Filed: Sep. 12, 2019

(65) Prior Publication Data

US 2020/0092953 A1 Mar. 19, 2020

Related U.S. Application Data

(60) Provisional application No. 62/731,373, filed on Sep. 14, 2018.

(51) Int. Cl.
*H05B 1/00* (2006.01)
*H05B 1/02* (2006.01)

(52) U.S. Cl.
CPC .................................. *H05B 1/0288* (2013.01)

(58) Field of Classification Search
CPC ............................ H05B 1/0288; H05B 1/0227
See application file for complete search history.

(56) References Cited

U.S. PATENT DOCUMENTS 3,619,088 A * 11/1971 Bullock ................ F04D 29/282 415/206
4,598,195 A * 7/1986 Matsuo ............. G05D 23/1906 219/508
11,352,923 B2 * 6/2022 Joshi ..................... F01N 3/2066
2007/0216055 A1 * 9/2007 Pilavdzic .......... B29C 45/14598 264/40.6
2014/0312028 A1 * 10/2014 Tiwana ................ H05B 1/0269 219/482
2018/0106686 A1 * 4/2018 Furtner .................... G01K 7/16
2019/0226751 A1 * 7/2019 Pasqual .................... H05B 3/48

FOREIGN PATENT DOCUMENTS

JP H0415089 B2 3/1992
JP 2017226558 A 12/2017
JP 2018004998 A 1/2018

OTHER PUBLICATIONS

Office Action issued in corresponding JP Application No. 2021-513841, dated May 31, 2023 including an English translation, 7 pages.
International Search Report for International Application PCT/US2019/050768, dated Nov. 20, 2019.

* cited by examiner

*Primary Examiner* — Matthew T Largi
(74) *Attorney, Agent, or Firm* — Burris Law, PLLC

(57) ABSTRACT

A control system for operating a heater includes a controller configured to determine an operational power level based on a measured performance characteristic of the heater, a power set-point, and a power control algorithm, determine a bake-out power level based on a measured leakage current at the heater, a leakage current threshold, and a moisture control algorithm, and select a power level to be applied to the heater. The selected power level is the lower power level from among the operational power level and the bake-out power level.

20 Claims, 5 Drawing Sheets

SYSTEM AND METHOD FOR A CLOSED-LOOP BAKE-OUT CONTROL

CROSS-REFERENCE TO RELATED APPLICATIONS

This application claims priority to and the benefit of U.S. Provisional application 62/731,373 filed on Sep. 14, 2018. The disclosure of the above application is incorporated herein by reference.

FIELD

The present disclosure relates to a thermal system and method for bake-out control of a heater.

BACKGROUND

The statements in this section merely provide background information related to the present disclosure and may not constitute prior art.

Thermal systems are used in a variety of applications and typically include a heater for heating a workpiece, and a control system for controlling the performance of the heater. The heater can be a layered heater having multiple resistive heating elements formed by a layered process (e.g., thick film, thin film, thermal spray, sol-gel), a metal sheathed heater, or other suitable heaters. The heater may be a low voltage heater operating at about 600V and below or a medium voltage heater operating at voltage levels at about 600V to 4 kV.

Moisture ingress can occur in many types of heaters, and is especially problematic for heaters that have hygroscopic insulation material that allow moisture ingress when the heater is at room temperature. To reduce or remove this moisture, the heater undergoes a "bake-out" process, during which the heater is powered to remove or reduce the moisture. In some applications, the heater may include a dedicated heater element for the bake-out process, and in others, the heater element used for heating the workpiece is controlled to perform the bake-out process.

Some bake-out processes are time-based controls that can result in too short or too long of a time period for the bake-out. If the bake-out time is too short, moisture remains in the heater, resulting in a heater that cannot be operated at full voltage, and therefore, the bake-out process must be repeated. If the bake-out time is too long, the thermal system may operate at high temperatures for a longer time than necessary, resulting in wasted power. These and other issues related to the removal of moisture from heaters are addressed by the present disclosure.

SUMMARY

This section provides a general summary of the disclosure and is not a comprehensive disclosure of its full scope or all of its features.

The present disclosure provides a control system for operating a heater comprising a controller configured to determine an operational power level based on a measured performance characteristic of the heater, a power set-point, and a power control algorithm. Furthermore, the controller determines a bake-out power level based on a measured leakage current at the heater, a leakage current threshold, and a moisture control algorithm, and selects a power level to be applied to the heater. The selected power level is the lower power level from among the operational power level and the bake-out power level.

In one form, the control system further comprises a first sensor configured to measure the performance characteristic of the heater, and a second sensor configured to measure the leakage current. In this form, the first sensor may be a discrete current sensor for measuring an operation current of the heater as the performance characteristic.

In another form, the heater is a two-wire heater, and the controller is configured to calculate an operation current as the performance characteristic based on a resistance of the heater.

In another form, the control system further comprises a power regulator circuit configured to electrically couple to the heater and apply the selected power level to the heater. In this form, the power regulator circuit may include a power switch operable by the controller to provide an adjustable power to the heater.

In a further form, the power control algorithm and the moisture control algorithm are defined as proportional-integral-derivative (PID) controls.

The present disclosure further provides a thermal system comprising the control system having some or all of the features disclosed above. The thermal system further comprises a heater electrically coupled to the control system, the heater including a heating element for heating a workpiece. The control system is configured to apply the desired power level to the heating element. In this form, the heater may be selected from a group consisting of a layered heater, a tubular heater, a cartridge heater, a polymer heater, and a flexible heater.

The present disclosure further provides a method for controlling a heater. The method comprises measuring a performance characteristic of the heater, measuring a leakage current, determining an operational power level based on the measured performance characteristic, a power set-point, and a power control algorithm, determining a bake-out power level based on the measured leakage current, a leakage current threshold, and a moisture control algorithm, and applying one of the operational power level or the bake-out power level as a selected power level to the heater.

In one form, the method further comprises selecting the lower power level from among the operational power level and the bake-out power level as the selected power level.

In another form, the performance characteristic is an amount of electric current in the heater.

In yet another form, the heater is selected from a group consisting of layered heater, tubular heater, cartridge heater, polymer heater, and flexible heater.

In one form, the power control algorithm and the moisture control algorithm may be defined as proportional-integral-derivative (PID) controls.

The present disclosure further provides a method for controlling moisture within a heater. The method comprises: operating the heater in a primary operation mode to heat a workpiece, wherein in the primary operation mode, an operational power level is applied to the heater; measuring, by a leakage current sensor, a leakage current of the heater, wherein the leakage current is indicative of moisture within the heater; determining a bake-out power level based on the measured leakage current, a leakage current threshold, and a moisture control algorithm, wherein the moisture control algorithm is defined as a proportional-integral-derivative (PID) control; operating the heater in a bake-out mode in response to the bake-out power level being less than the operational power level; and operating the heater in the primary operation mode in response to the bake-out power level being greater than the operational power level.

In one form, the step of operating the heater in primary operation mode further includes measuring a performance characteristic of the heater, and determining the operational power level based on the measured performance characteristic, a power set-point, and a power control algorithm, wherein the power control algorithm is defined as a PID control. In this form, the performance characteristic may be an operation current flowing through the heater.

In other forms, the method further includes calculating an operation current of the heater, as the performance characteristic, based on a resistance of the heater, and/or measuring an operation current of the heater as the performance characteristic with a discrete current sensor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
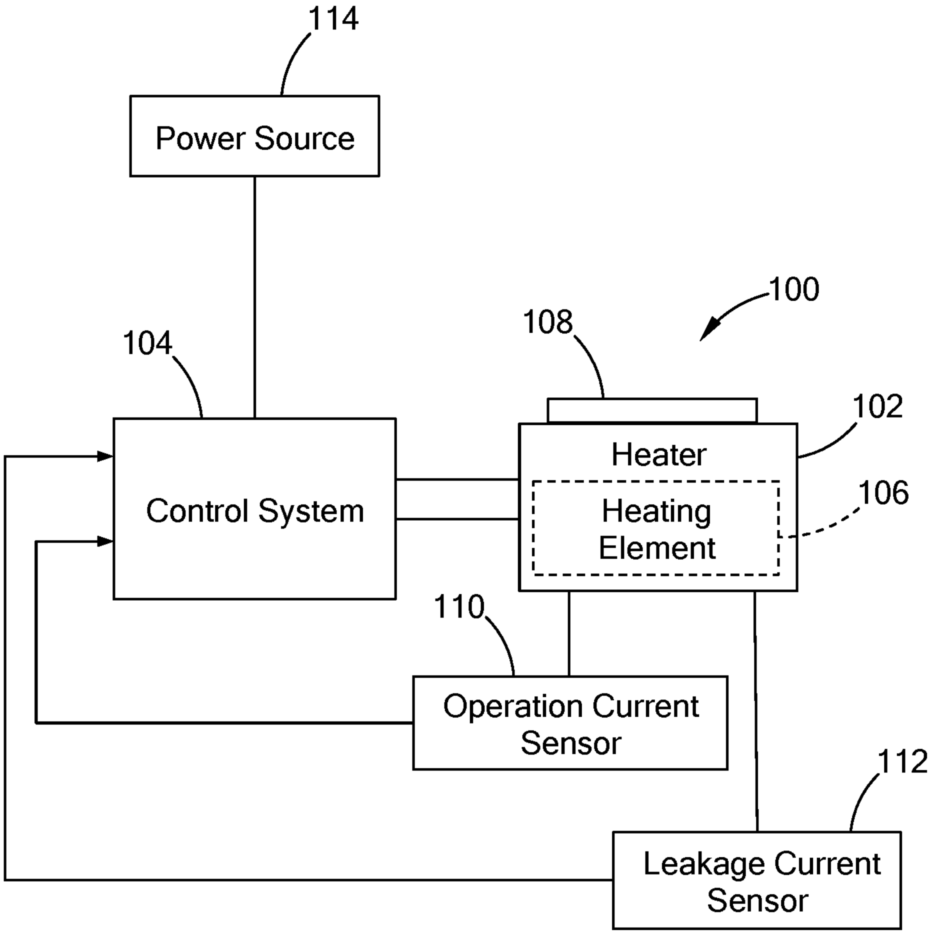
FIG. 1 is a block diagram of a thermal system including a heater and a control system in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is directed toward a control system for controlling moisture accumulating in a heater by way of a bake-out process. Referring to FIG. 1, in one form, a thermal system 100 includes a heater 102 and a control system 104 that is configured to control the heater 102.

Figure 2A:
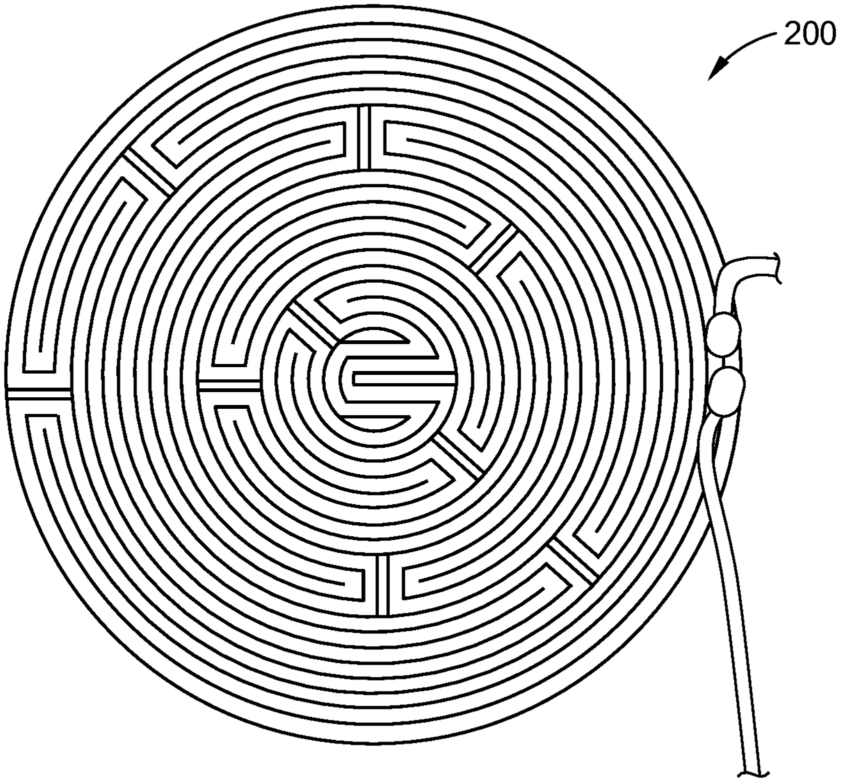
FIG. 2A PRIOR ART
FIG. 2A is a top view of an exemplary layered heater formed by a layered process.
Figure 2B:
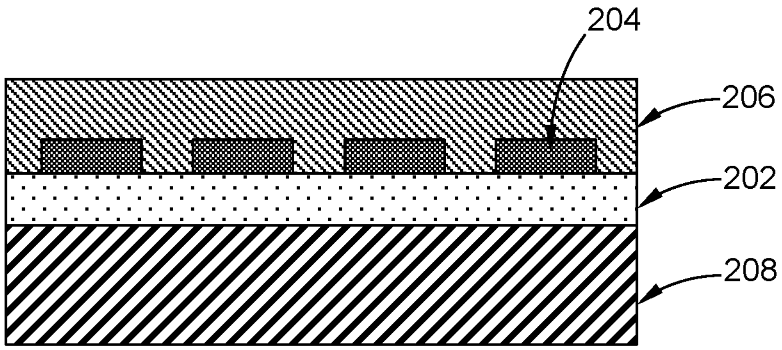
FIG. 2B PRIOR ART
FIG. 2B is a representative cross-sectional view of a layered heater.

In one form, the heater 102 includes one or more heating elements 106 operable to heat a workpiece 108. For example, referring to FIGS. 2A and 2B, the heater 102 may be a layered heater 200 that includes a dielectric layer 202, a resistive layer 204 defining one or more heating elements, and a protective layer 206 disposed on a substrate 208. In one form, the heating elements formed by the resistive layer 204 are two-wire heating elements that are operable as heaters and as temperature sensors to detect one or more electrical characteristics of the heating elements. Such a two-wire heating element is disclosed in U.S. Pat. No. 7,196,295, which is commonly assigned with the present application and incorporated herein by reference in its entirety.

It should be understood that the number of layers of the layered heater 200 and the configuration of the layers is merely exemplary and that a variety of combinations of layers applied to each other, without a separate substrate, are within the teachings of the present disclosure. Such variations are disclosed, by way of example, in U.S. Pat. Nos. 7,132,628 and 8,680,443, which are commonly assigned with the present application and the contents of which are incorporated herein by reference in their entirety. These layers are formed through the application or accumulation of a material to a substrate or another layer using processes associated with thick film, thin film, thermal spraying, or sol-gel, among others.

Figure 3:
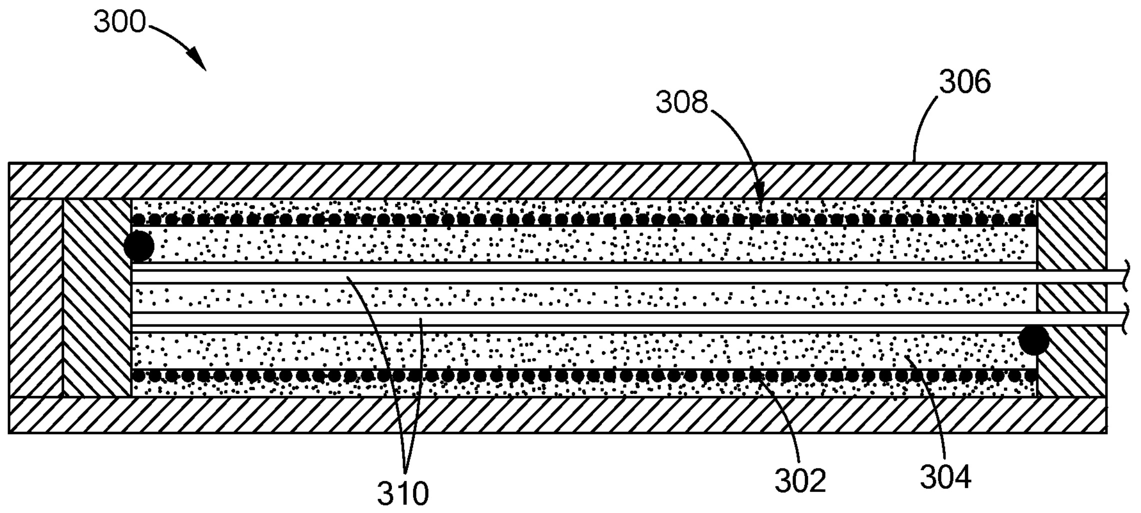
FIG. 3 PRIOR ART
FIG. 3 is a partial cross-sectional view of a cartridge heater.

While the heater 102 is described as a layered heater, the teachings of the present disclosure can be applied to other types of heaters, such as tubular heaters, cartridge heaters, polymer heaters, and flexible heaters, among others, and thus should not be limited to layered heaters. For example, referring to FIG. 3, the heater 102 may be a cartridge heater 300 that includes a resistive heating element 302 (e.g., a metal wire) disposed around a nonconductive portion 304, a sheath 306, a dielectric material 308 (e.g., MgO) disposed between the resistive heating element 302 and the sheath 306, and two pins 310. In one form, the pins 310 are connected to lead wires (not shown) and extend through the nonconductive portion 304 and connect to the ends of the resistive heating element 302 for supplying power to the resistive heating element.

During operation, moisture may begin to accumulate within the heater 102, such as within the dielectric layer 202 and/or the protective layer 206 of the layered heater 202. In another example, and specifically the cartridge heater 300, moisture may begin to accumulate between the ends of the resistive heating elements 302 and the lead wires. Moisture within the heater 102 creates alternative current paths, and the current flowing through these alternative paths are commonly referred to as leakage current. In some applications, the heater 102 draws more total current when there is moisture than when the heater 102 is dry due to additional current occurring from hot to ground. Generally, to remove any moisture, the heater 102 undergoes a bake-out process during which one or more heating elements 106 within the heater 102 are activated to remove or "bake-out" moisture.

With continuing reference to FIG. 1, to monitor the current within the heater 102, the thermal system 100 includes an operation current sensor 110 (e.g., a first current sensor), and a leakage current sensor 112 (e.g., a second current sensor) electrically connected to the heater 102. The number of operation current sensor(s) 110 and the leakage current sensor(s) 112 may vary based on the type of heater 102 being used. In one form, the operation current sensor 110 is a current transformer that measures the current flowing through the heater 102 (i.e., current leaving the heater 102 on the intended neutral conductor), which may be referred to as the operation current of the heater 102 and is an example of a performance characteristic of the heater 102.

Figure 4:
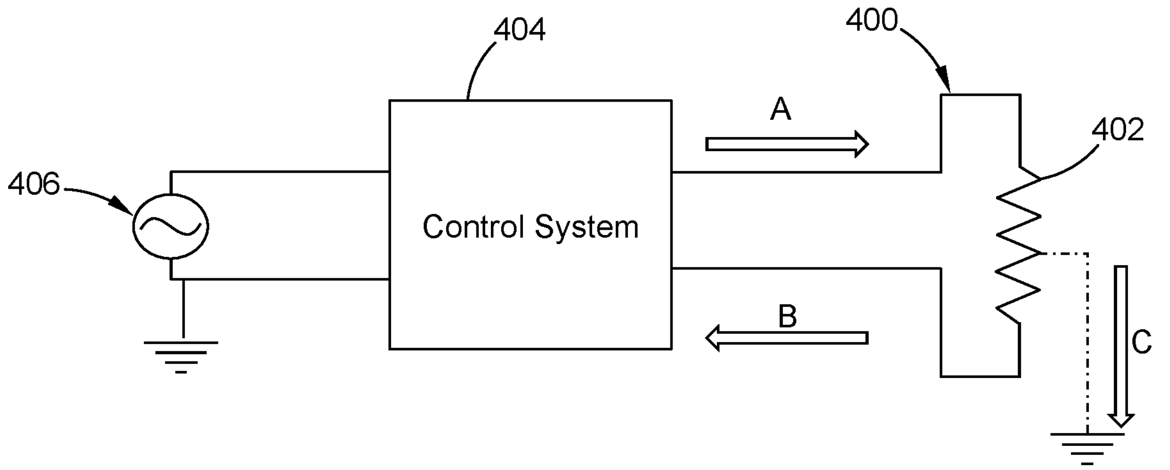
FIG. 4 is a circuit diagram of the thermal system of FIG. 1 illustrating a path for leakage current according to the present disclosure.

For example, FIG. 4 is an exemplary diagram illustrating the operation current and leakage current through a heater. In the example, a heater 400 having a heating element 402 receives power from a control system 404, which is configured in a similar manner as the control system 104. As detailed below, the control system 404 receives power from a power source 406 and is configured to adjust the power to a selected voltage which is applied to the heater 400. Arrows A and B illustrate a normal current path for the operation current. When moisture begins to accumulate, a leakage path is created at the heater 400 which is illustrated by the dash-dot-dash line with arrow C illustrating the direction of the leakage current.

In one form, if the heater 102 is in a two-wire system, the operation current is measured based on the change in resistance of the heating element 106. That is, such a thermal system merges heater designs with controls that incorporate power, resistance, voltage, and current in a customizable feedback control system that limits one or more these parameters (i.e., power, resistance, voltage, current) while controlling another. For example, by calculating the resistance of the heating element and knowing the voltage being applied, the operation current through the heating element is determined without the use of a discrete sensor. According, the two-wire system may operate as an operation current sensor.

In one form, the leakage current sensor 112 is a current transformer that measures the amount of leakage current leaving the heater 102 on, for example, the ground conductor. The operation current sensor 110 and the leakage current sensor 112 transmit signals indicative of their respective current measurements to the control system 104, which in return controls the amount of power applied to the heater 102.

With continuing reference to FIG. 1, the control system 104 is connected to a power source 114, such as an AC or DC power source, and is configured to apply an adjustable input voltage to the heater 102. The control system 104 includes a combination of electronics (e.g., microprocessor, memory, a communication interface, voltage-current converters, and voltage-current measurement circuit, among others) and software programs/algorithms stored in memory and executable by the microprocessor to perform the operations described herein.

More particularly, in one form, the control system 104 is configured to control the heater 102 during a primary operation, during which time the heater 102 is heating the workpiece 108 in accordance with one or more predefined performance parameters. In one form, the primary operation of the heater 102 includes different operational states, such as a warm-up state, steady-state, and/or a power-down state. Each operational state may include different performance parameters such as a power set-point, for the given state. During the primary operation, the control system 104 monitors the moisture within the heater 102 by way of the measured leakage current from the leakage current sensor 112, and interrupts the primary operation to perform a bake-out process when the leakage current exceeds a leakage current threshold.

More particularly, based on the signals from the sensors 110 and 112, and predefined control algorithms, the control system 104 determines the amount of power needed to limit the leakage current and the amount of power needed to meet the power set-point for the primary operation. The lower of the two power amounts is then applied to the heater 102. More particularly, in some applications, the leakage current is limited during the bake-out process by applying a low voltage to the heater 102 to prevent excessive current to ground, which can damage the heater 102 and/or other equipment. As moisture is removed from the heater 102, the resistance along the area having the moisture increases (e.g., along or within the insulation/dielectric), permitting an increase in voltage to the heater 102 without exceeding the leakage current threshold. In one form, the control algorithm is a proportional-integral-derivative (PID) control.

Figure 5:
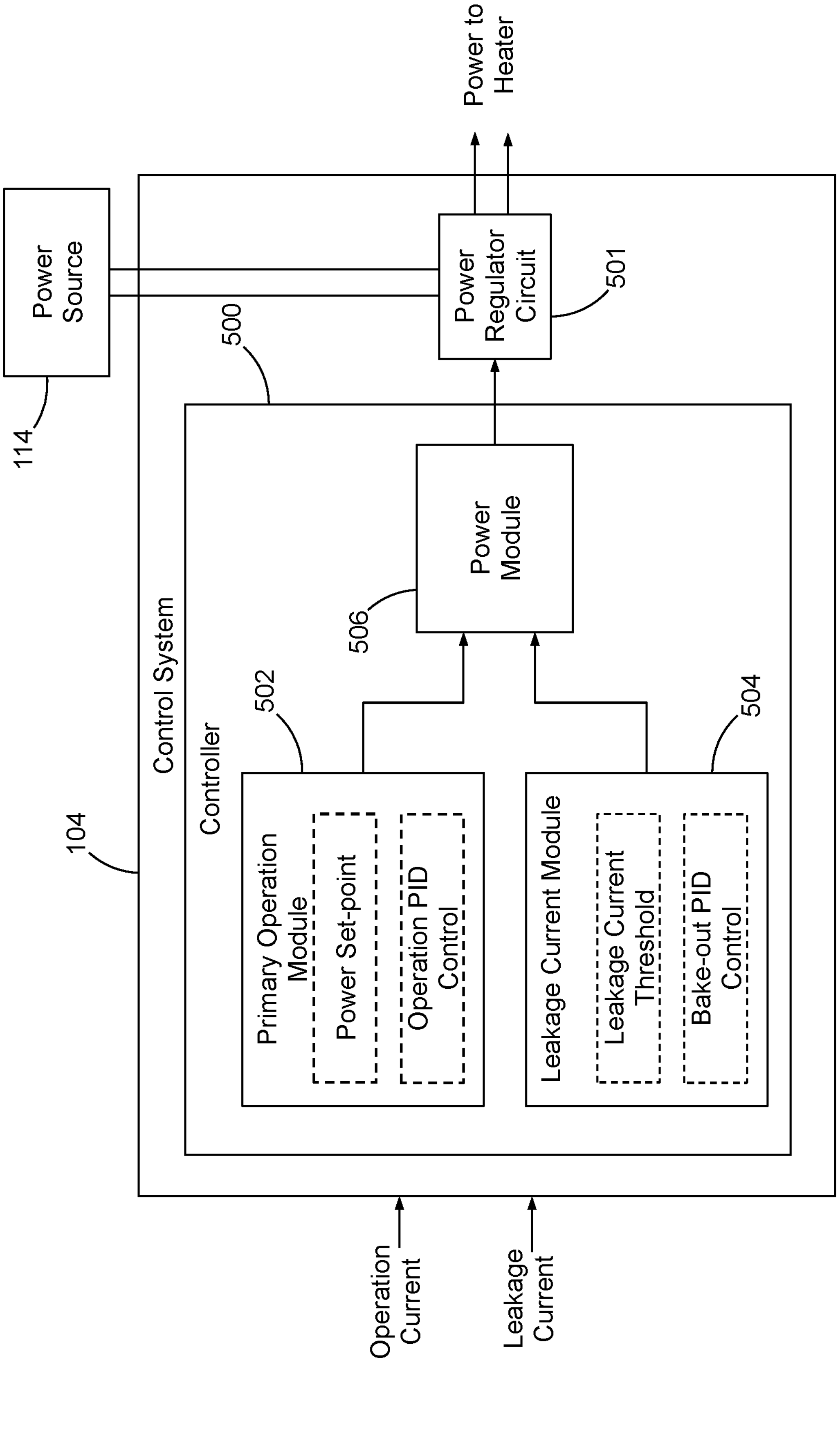
FIG. 5 is a block diagram of the control system of FIG. 1.

Referring to FIG. 5, in one form, the control system 104 includes a controller 500 and a power regulator circuit 501. The controller 500 is configured to include a primary operation module 502, a leakage current module 504, and a power module 506, and a power module. The primary operation module 502 determines an operational power level based on the measured operation current from the operation current sensor 110, the power set-point, and a power control algorithm. In one form, the power set-point is a baseline parameter that can be set by the user using a user interface (i.e., user-defined set-point) for the operation state being performed and/or a predefined value associated with the operation state. The power control algorithm, in one form, is defined as a PID control (i.e., a first PID control or an operation PID control) to calculate the operational power level to be applied to the heater 102 to have the actual power applied to the heater 102 be closer to the power set-point. For example, in one form, the power control algorithm calculates the actual power being supplied to the heater 102 based on the measured operation current and an input voltage applied to the heater 102. The power control algorithm determines the difference between the actual power being applied to the power set-point, and determines the level of power needed (i.e., the operational power level) for minimizing the difference between the actual power of the heater and the power set-point. Accordingly, with the PID control, the primary operation module 502 is provided as a closed-loop control to adjust the power applied to the heater 102 to meet the power set-point.

The leakage current module 504 determines a bake-out power level based on the measured leakage current from the leakage current sensor 112, the leakage current threshold, and a moisture control algorithm. The leakage current threshold is a preset value that is the level of leakage current permitted (e.g., 30 mA or other value), and thus, is indicative of the amount of moisture permitted. The moisture control algorithm in one form is defined as a PID control (i.e., a second PID control or a bake-out PID control) to calculate the bake-out power level for reducing the leakage current to a value at or below the leakage current threshold. For example, in one form, the moisture control algorithm determines the difference between the measured leakage current and the leakage current threshold, and calculates the level of power needed (i.e., the bake-out power level) to reduce the actual leakage current level to below or at the leakage current threshold. Accordingly, with the PID control, the leakage current module 304 is a closed-loop control to adjust the power applied to the heater 102 to quickly bake out the moisture in the heater 102 (i.e., reduce the leakage current).

The power module 506 selects a power level from among the operational power level and the bake-out power level and transmits controls the power regulator circuit to apply the selected power level (i.e., input voltage). In one form, the power module 506 is configured to select the lower power level from the among the operational power level and the bake-out power level as the selected power level.

In one form, the power regulator circuit 501 is configured to adjust the power from the power source 114 to the selected power level and apply the adjusted power to the heater 102. The power regulator circuit 501 may include includes thyristor, voltage dividers, voltage converters, transformer, power switches, and/or other suitable electronic components. For example, in one form, the power regulator circuit 501 is configured to use low phase angle switching or zero crossing switching to adjust the voltage from the power source. In another example, the power source 114 may include a high voltage source for the operational power level and low voltage source for the bake-out power level, and the power regulator circuit 501 is configured to switch between the two sources based on a control signal from the power module 506. In yet another example, the power regulator circuit 501 is configured to provide both high and low currents by way of a variac. In another example, the power regulator circuit 501 is configured as a power converter including a rectifier and a buck converter. Such a power converter system is described in U.S. Ser. No. 15/624,060, filed Jun. 15, 2017 and titled "POWER CONVERTER FOR A THERMAL SYSTEM" which is commonly owned with the present application and the contents of which are incorporated herein by reference in its entirety. In yet another example the power regulator circuit 501 is a DC power supply. It should be readily understood that the controller is configured to operate the power regulator circuit 501 and may include different circuitry and software applications based on the power regulator circuit 501.

In operation, the primary operation module 502 controls the power applied to the heater 102 to heat the workpiece during a given operation state. During the primary operation, the leakage current module 504 monitors the leakage current within the heater 102. Specifically, the leakage current module 504 outputs a bake-out power level that is greater than that of the operational power level as long as the measured leakage current is below the leakage current threshold. Once the measured leakage current is greater than or equal to the leakage current threshold, the leakage current module 504 having the moisture control algorithm, outputs a power level that is lower than that of the operational power level to initiate the bake-out control.

By having the operation PID control and the bake-out PID control, the control system of the present disclosure is operable to decrease the bake-out time by taking only the time needed to decrease the leakage current and thus, remove moisture from the heater. More particularly, in lieu of discrete time periods and set power amounts, the PID control of the moisture control algorithm is a ramp algorithm that continues to ramp up the voltage until the leakage current falls below the leakage current threshold For example, in one form, the leakage current threshold may be set at or about zero amps, such that once a leakage current is detected, the bake-out operation is performed to remove the moisture. Thus, PID control decreases the time and overall power needed to dry out the heater.

The control system may be configured to include additional operational features while remaining within the scope of the present disclosure. For example, the control system may be configured to communicate with one or more external devices to output data regarding the operation of the heater and/or receiving inputs from a user. In another example, the control system may execute a diagnostic routine to assess whether the thermal system is operating within predetermined parameters, and thus, to detect possible abnormalities.

Figure 6:
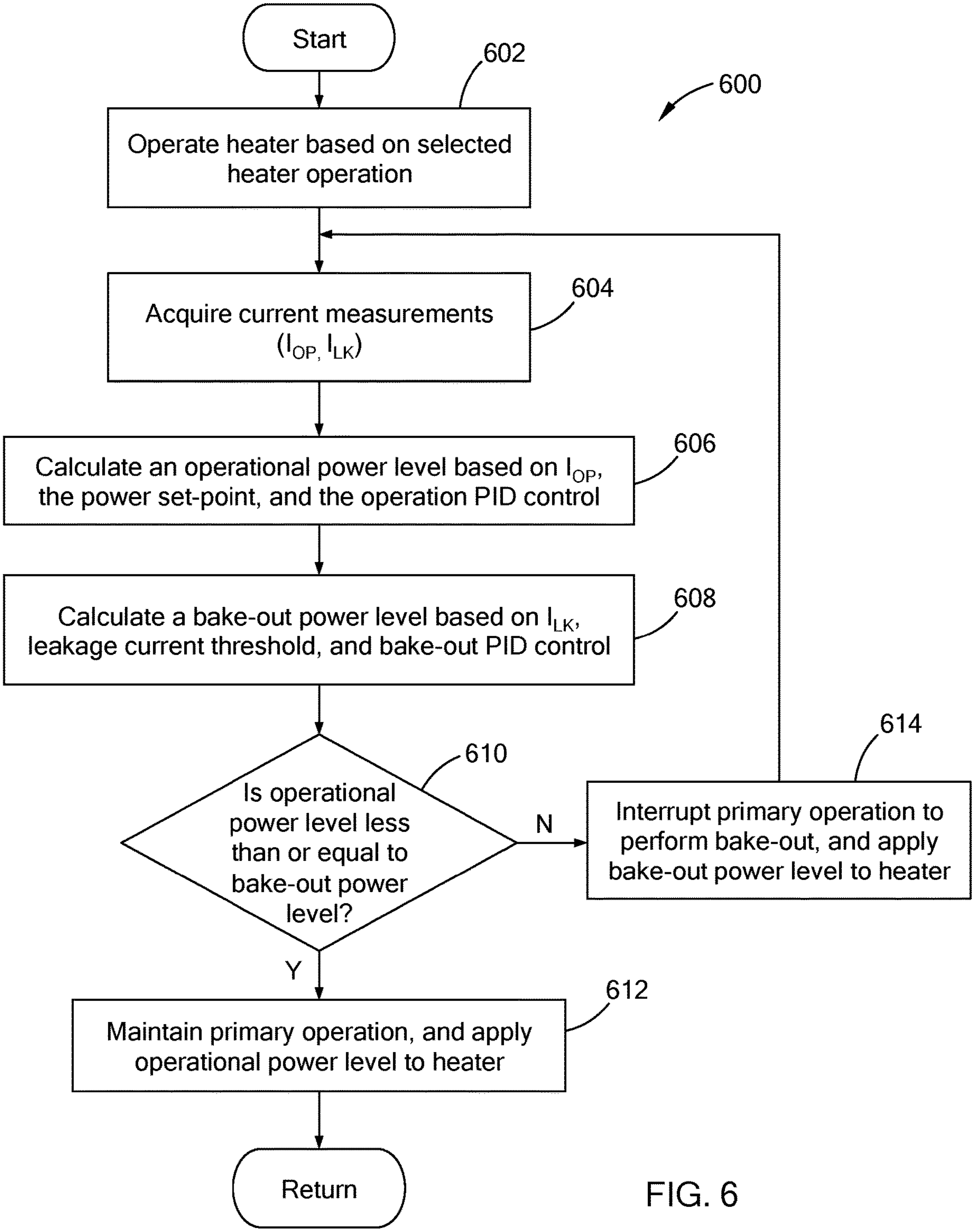
FIG. 6 is a flowchart of a heater control routine to control moisture removal in a heater according to the present disclosure.

Referring to FIG. 6, an example of a heater control routine 600 is provided. In one form, the heater control routine 600 is executed by the control system when power is applied to the heater. At 602, the control system operates the heater in accordance with a selected heater operation, and at 604, acquires the operation current (10P) and the leakage current (ILK) from the operation current sensor and the leakage current sensor, respectively.

At 606, using the operation PID control, the control system calculates the operational power level, and at 608 calculates the bake-out power level, as described above. At 610, the control system determines whether the operational power level is less than or equal to the bake-out power level. If the operational power level is less than the bake-out power level, the primary operation is maintained, and the control system applies the operational power level to the heater, at 612, and returns to the top of the routine to operate the heater. Conversely, if the operational power level is greater than the bake-out power level, the primary operation is interrupted to perform bake-out operation. Accordingly, at 614, the control system applies the bake-out power level to the heater, and returns to 604 to acquire the current measurements. The routine 600 may be stopped when a main switch to the control system is closed and power is no longer being applied to the heater, when an abnormal condition is detected within the thermal system, and/or other suitable conditions.

The routine/method described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

It should be readily understood, that while specific example diagrams are provided for the control system, the system may include additional components not detailed in the diagram. For example, the control system includes components, such as the primary controller and the auxiliary controllers, that operate at a lower voltage than, for example, the power converters of the zone control circuits. Accordingly, the control system includes a low power voltage supply (e.g., 3-5V) for powering low voltage components. In addition, to protect the low voltage components from high voltage, the control system includes electronic components that isolate the low voltage components from the high voltage components and still allow the components to exchange signal.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control system for operating a heater, the control system comprising:

a controller configured to:

determine an operational power level based on a measured performance characteristic of the heater, a power set-point, and a power control algorithm, determine a bake-out power level based on a measured leakage current at the heater, a leakage current threshold, and a moisture control algorithm, and select a power level to be applied to the heater, wherein the selected power level is a lower power level from among the operational power level and the bake-out power level.

2. The control system of claim 1 further comprising:

a first sensor configured to measure the performance characteristic of the heater; and a second sensor configured to measure the leakage current.

3. The control system of claim 2, wherein the first sensor is a discrete current sensor for measuring an operation current of the heater as the performance characteristic.

4. The control system of claim 1, wherein the heater is a two-wire heater, and the controller is configured to calculate an operation current as the performance characteristic based on a resistance of the heater.

5. The control system of claim 1 further comprising a power regulator circuit configured to electrically couple to the heater and apply the selected power level to the heater.

6. The control system of claim 5, wherein the power regulator circuit includes a power switch operable by the controller to provide an adjustable power to the heater.

7. The control system of claim 1, wherein the power control algorithm and the moisture control algorithm are defined as proportional-integral-derivative (PID) controls.

8. A thermal system comprising:

the control system of claim 1; and the heater electrically coupled to the control system, and including a heating element for heating a workpiece, wherein the control system is configured to apply the selected power level to the heating element.

9. The system of claim 8, the heater is a two-wire heater, and the controller of the control system is configured to calculate an operation current as the performance characteristic based on a resistance of the heater.

10. The system of claim 8, wherein the heater is selected from the group consisting of a layered heater, a tubular heater, a cartridge heater, a polymer heater, and a flexible heater.

11. A method for controlling a heater comprising:

measuring a performance characteristic of the heater;

measuring a leakage current;

determining an operational power level based on the measured performance characteristic, a power set-point, and a power control algorithm;

determining a bake-out power level based on the measured leakage current, a leakage current threshold, and a moisture control algorithm; and applying one of the operational power level or the bake-out power level as a selected power level to the heater, wherein the selected power level is a lower power level from among the operational power level and the bake-out power level.

12. The method of claim 11 further comprising selecting the lower power level from among the operational power level and the bake-out power level as the selected power level.

13. The method of claim 11, wherein the performance characteristic is an amount of electric current in the heater.

14. The method of claim 11, wherein the heater is selected from the group consisting of layered heater, tubular heater, cartridge heater, polymer heater, and flexible heater.

15. The method of claim 11, wherein the power control algorithm and the moisture control algorithm are defined as proportional-integral-derivative (PID) controls.

16. A method for controlling moisture within a heater, the method comprising:

operating the heater in a primary operation mode to heat a workpiece, wherein in the primary operation mode, an operational power level is applied to the heater;

measuring, by a leakage current sensor, a leakage current of the heater, wherein the leakage current is indicative of the moisture within the heater;

determining a bake-out power level based on the measured leakage current, a leakage current threshold, and a moisture control algorithm, wherein the moisture control algorithm is defined as a proportional-integral-derivative (PID) control;

operating the heater in a bake-out mode in response to the bake-out power level being less than the operational power level; and operating the heater in the primary operation mode in response to the bake-out power level being greater than the operational power level.

17. The method of claim 16, wherein the operating the heater in the primary operation mode further includes:

measuring a performance characteristic of the heater; and determining the operational power level based on the measured performance characteristic, a power set-point, and a power control algorithm, wherein the power control algorithm is defined as a PID control.

18. The method of claim 17, wherein the performance characteristic is an operation current flowing through the heater.

19. The method of claim 17 further comprising calculating an operation current of the heater, as the performance characteristic, based on a resistance of the heater.

20. The method of claim 17 further comprising measuring an operation current of the heater as the performance characteristic with a discrete current sensor.

* * * * *